UNITED STATES PATENT OFFICE.

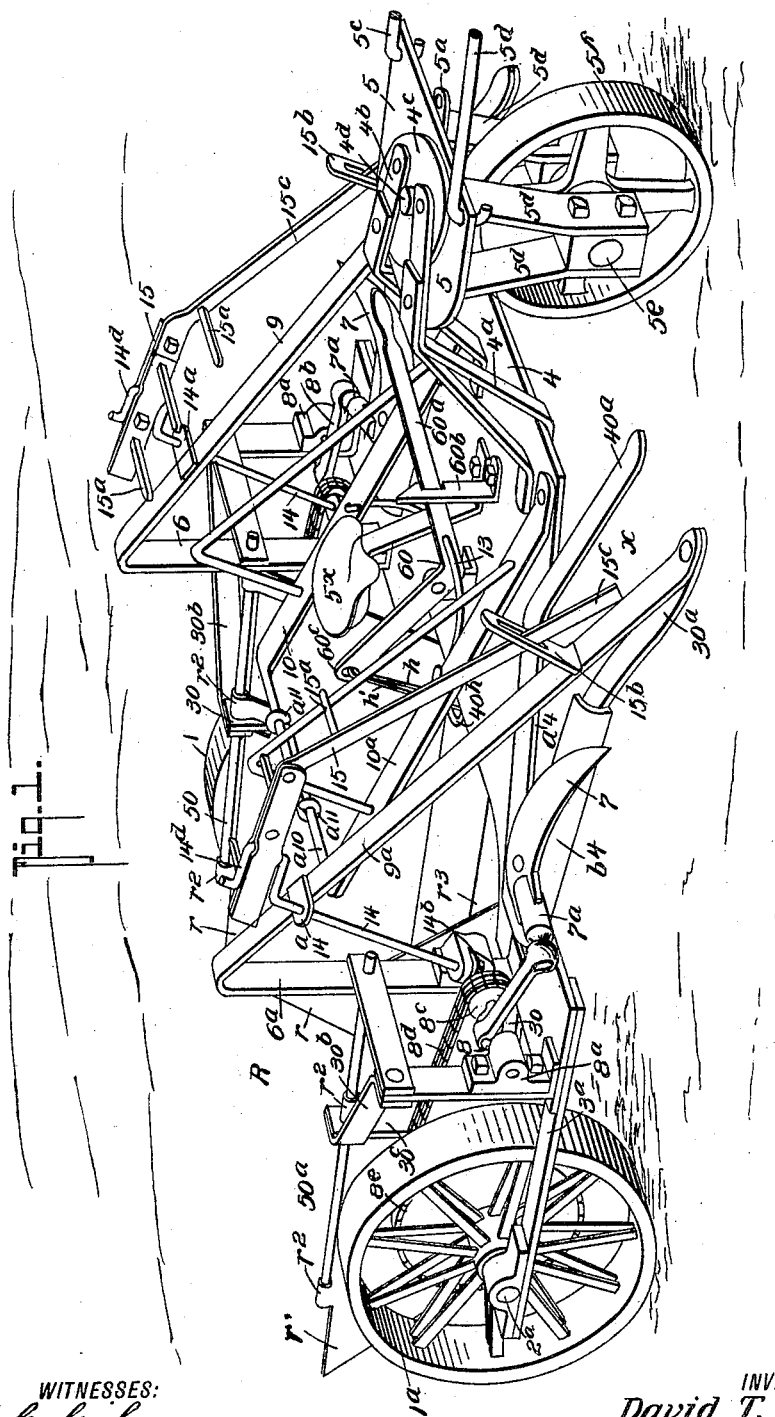

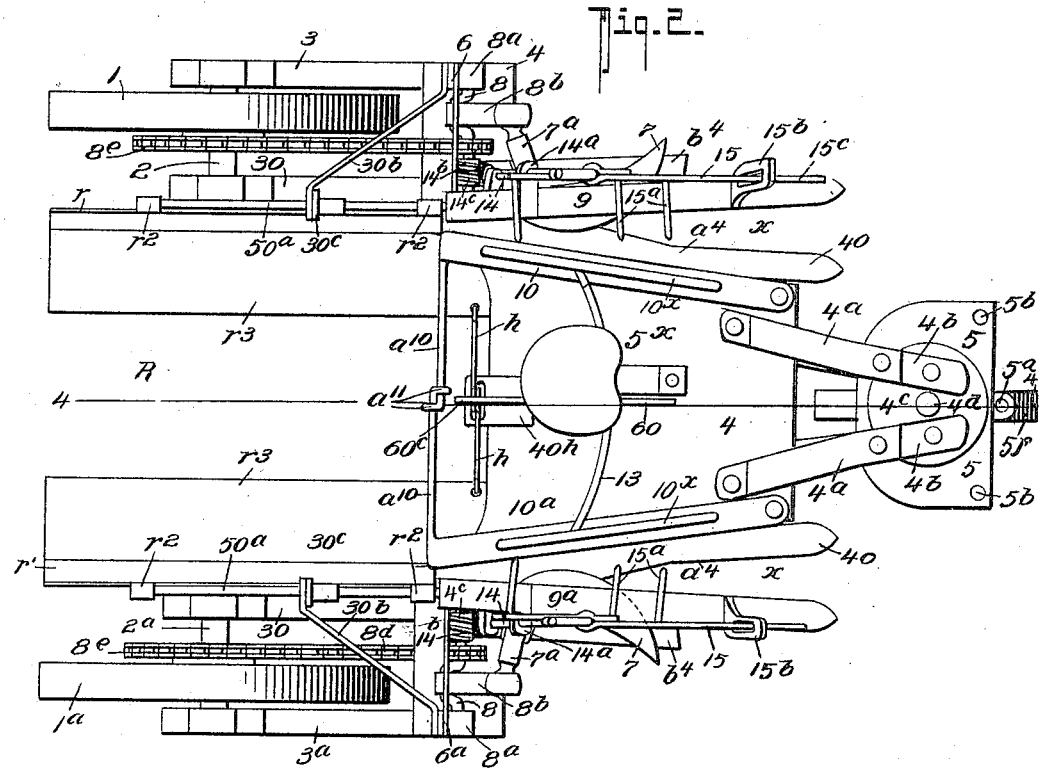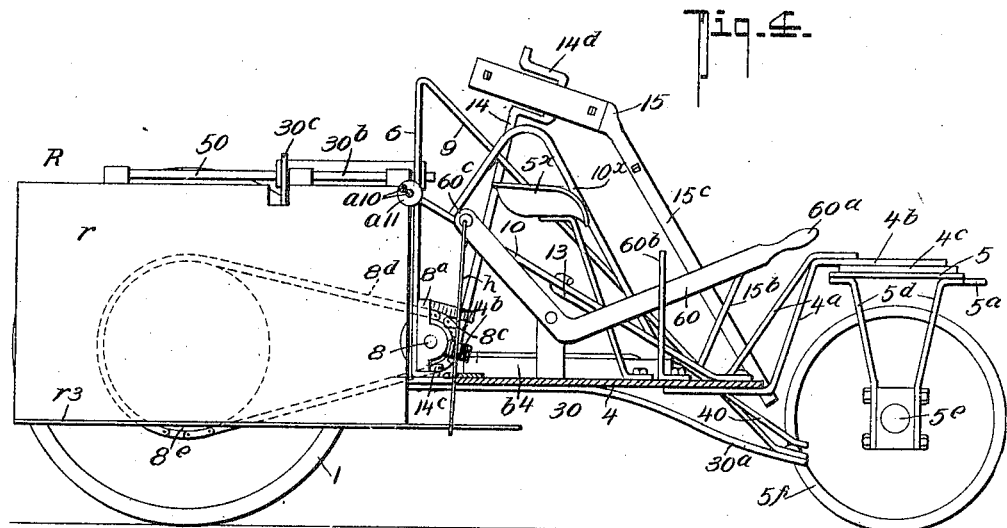

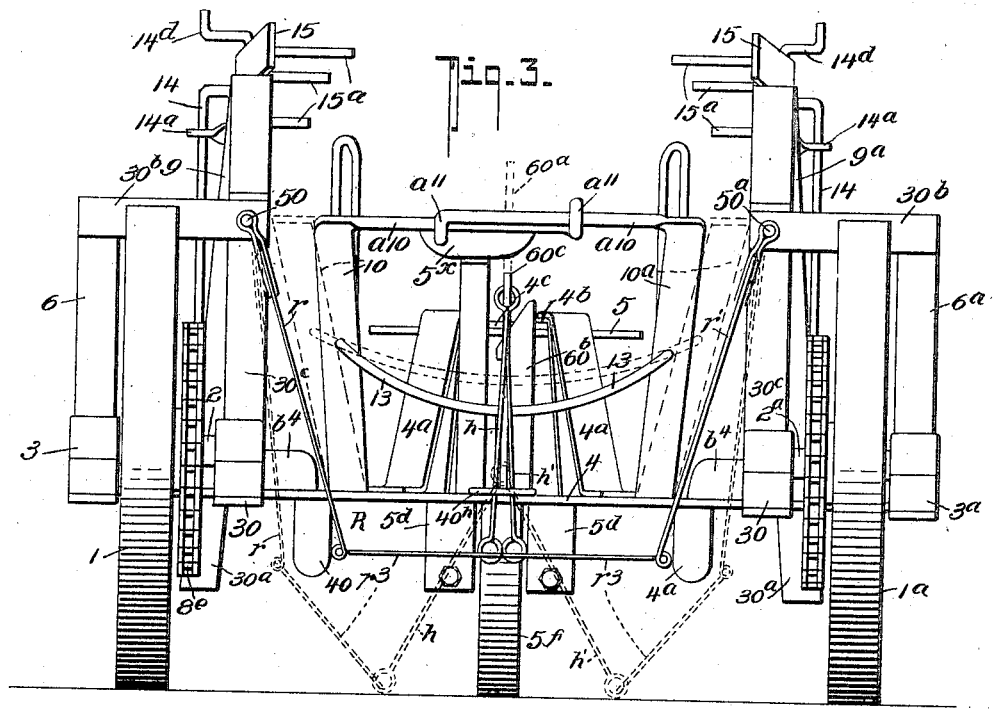
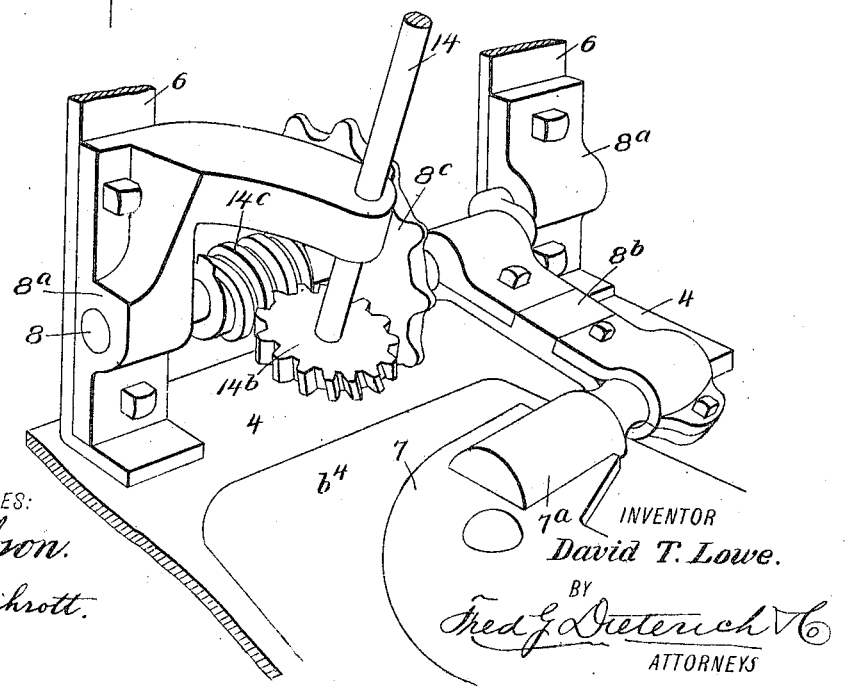

DAVID T. LOWE, OF PANA, ILLINOIS.

CORN-HARVESTER.

No. 812,575.

Specification of Letters Patent.

Patented Feb. 13, 1906.

Application filed May 4, 1905. Serial No. 258,849.

*To all whom it may concern:*

Be it known that I, DAVID T. LOWE, residing at Pana, in the county of Christian and State of Illinois, have invented a new and Improved Corn-Harvester, of which the following is a specification.

This invention, which relates generally to improvements in machines for cutting cornstalks, broom-corn, sugar-cane, and the like, more particularly refers to that class of cornharvesters having cutting devices for severing the stalk mounted on a wheel-supported frame and in which means is provided for accumulating the severed stalks in a sufficient quantity to form a shock and which also includes means for dumping the accumulated bunch of shock, and, primarily, my invention seeks to provide a machine of the type referred to of a simple and compact form especially designed for operating on two rows of stalks at one time, in which the means for turning the cut stalks down into the receiver are positively driven from the cutter-actuating shafts and in which the operation of cornharvesting is rendered simple and effective under the application of unskilled labor.

My invention in its generic nature comprehends a special coöperative arrangement of cutter mechanisms, leads or throatways for guiding the stalks to the cutters, a reciprocating sweep mechanism for turning down the cut stalks, a receiver for the stalks having a drop-bottom, and a means under direct control of the driver for lowering the said bottom to drop the bundle or shock and for simultaneously closing the stalk passage or throat to hold back the freshly-cut stalks from dropping into the receiver during the operation of dropping the collected bundle or shock.

In its more subordinate nature my invention consists in certain details of construction and peculiar combination of parts, all of which will be hereinafter fully described, pointed out in the appended claims, and illustrated in the accompanying drawings, in which—

Figure 1 is a perspective view of my improved construction of harvesting-machine. Fig. 2 is a plan view thereof, the drop-bottom being shown open and the inclined guides that form one edge of the stalk passages or throat being shown swung outwardly to close off the feed of the cut stalks from the receiver. Fig. 3 is a rear elevation of the same, the parts being in the position shown in Fig. 2. Fig. 4 is a longitudinal section taken practically on the line 4 4 in Fig. 2, the parts being in their normal positions. Fig. 5 is a detail view illustrating the mechanism that connects with and actuates the cutters and the reciprocating stalk turners or feeders.

In the practical construction the several parts suitably proportioned are arranged substantially in the manner best shown in Fig. 1, in which 1 $1^a$ designate the supportingwheels, each of which is loosely mounted upon a short shaft 2 $2^a$, mounted in the ends of the bifurcated rearwardly-extending frames 3 $3^a$, bolted or otherwise made fast to the main frame or platform 4, upon which the driver's seat $5^x$ is mounted and which at the front has upwardly-extending arms $4^a$, that terminate in forwardly-projecting horizontal extensions $4^b$ $4^b$, made fast to a horizontal disk $4^c$, having a centrally-disposed pendent stud $4^d$, on which the draft-plate 5 is fulcrumed to turn in the horizontal plane and which includes an eye $5^a$ to receive a swingletree when the machine is drawn by a single horse, said plate 5 also having apertures $5^b$ to receive the ends of a draft-bail $5^c$ when it is desired to use two horses in tandem. The draft-plate has pendent brackets $5^d$ $5^d$, the lower ends of which form bearings for the shaft $5^e$, that carries the guide or casterwheel $5^b$.

6 $6^a$ designate a pair of vertically-disposed yoke-frame sections, one in line with each of the wheels 1 and $1^a$, and the said frame-sections are bolted or otherwise made fast to the platform 4 where the members 3 $3^a$ connect therewith, and the same means that fastens the members 3 $3^a$ to the platform 4 may be used for securing the base of the frames 6 $6^a$.

The inner members 30 of the frames 3 $3^a$ extend forwardly to a point in line with the front edges of the platform 4 and the front ends are bent downwardly to form fingers $30^a$ to readily pass by the stalk near the base thereof and said members 30 also form the bottom horizontal portion of one side of the stalk passage or throats $x$ $x$, of which there are two, one at each side thereof, as shown. The horizontal portion of each stalk-passage has its inner side formed by a finger portion 40 $40^a$, disposed in a plane somewhat higher than its opposing fingers $30^a$, so that as the machine passes forward the opposite side bearings of the stalk-receiving throats or passages will engage the stalk at different heights, whereby to the better brace and steady the stalks as they are operated on by the cutters. The finger portions 40 40$^a$ also incline downwardly and outwardly and are disposed approximately parallel with the opposing fingers 30$^a$ 30$^a$, and their inner ends are secured to the upper face of the opposite edges of the platform 4, which edges (designated $a^4$) are disposed in the plane of supplemental sections $b^4$ in the nature of angle-plates secured to the main platform and over the members 30 30, and the said sections $b^4$ and the edges $a^4$ converge to form a restricted throat for leading the stalk to the cutters 7.

Each cutter 7 is substantially cresent shape and is fulcrumed on the top of its corresponding section $b^4$ to sweep inwardly over the stalk passages and edges $a^4$, the latter forming stationary knife-edges, as it is over these edges the cutters 7 operate with a shearing action.

Each cutter is actuated by a drive means coupled with its respective drive-wheel, and the said means (best shown in Fig. 5) comprises a short crank-shaft 8, journaled in boxes 8$^a$ 8$^a$ on the lower ends of the vertical frame members 6 6$^a$, to which is connected a link 8$^b$ also connected to the crank extension 7$^a$ of the cutters in such manner that as the shaft 8 is actuated a reciprocal sweep motion is imparted to the cutter. The shaft 8 carries a sprocket-wheel 8$^c$, around which takes the drive-chain 8$^d$, that passes around the large drive-sprocket 8$^e$ on the inside of the drive-wheel, as shown.

To the upper end of each of the vertical frame members 6 6$^a$ are attached the guide-rails 9 9$^a$, that extend forwardly and downwardly and have their lower ends made fast to the outer ends of the finger members 30$^a$ 30$^a$, and the said rails form the upper fixedly-held side guides of the stalk passages or throats and they also form a support for the stalk turners or feeder devices presently referred to.

Coöperating with the members 9 9$^a$ are guide members 10 10$^a$, having inclined vertically-held guide-rods 10$^\times$ 10$^\times$, which also incline upwardly from the front end of the platform and form the inner movably-held side guides of the stalk-passages. Each member 10 10$^a$ is pivotally connected at its lower end to the platform 4 to swing laterally, whereby to vary the exit end of the upper stalk-passage, the purpose of which will presently appear, and to provide for such adjustment of the members 10 10$^a$ their upper ends terminate in inwardly-projecting bars $a^{10}$, having eyes $a^{11}$ $a^{11}$, that telescopically engage the opposing rod portions and to normally hold the two members 10 10$^a$ contracted to their normal position, whereby to provide the maximum width of passage for the cut stalks. The said members 10 10$^a$ are joined by a bow-spring rod 13, as clearly shown in the drawings.

Mounted on each of the guide members 9 9$^a$ is a combined rotary and reciprocating feeder or sweep member, arranged to move over the upper throat or passage-way for the cut stalks and for engaging the upper portions of the cut stalks to force them in their vertical position toward the exit of the said throats or passage-ways and each of the said sweep or feeder mechanisms consists of a rotary shaft 14, journaled near the upper end in a bearing 14$^a$, projected laterally from the plate 9 or 9$^a$ and having its lower end suitably supported and provided with a pinion 14$^b$ to engage a worm 14$^c$ on the crank-shaft 8, the gear connections just described being arranged to impart a proper rotary motion to the shaft 14. The upper ends of the shafts 14 have crank portions 14$^d$, that engage the bars 15, that carry inwardly-projecting prongs 15$^a$, that project over their adjacent stalk-passage, and the said bars 15 have forwardly and downwardly extending brace members 15$^c$ 15$^c$, guided in slotted bearings 15$^b$, projecting up from the members 9 9$^a$, as shown.

By arranging the sweep or feeder members and imparting motion therto as shown it is manifest that as the drive-wheels travel forward the cutters are actuated to sever the stalks near the lower end, and as they are thus cut the rake-like fingers 15$^a$ engage the upper end of the cut stalks and turn them down, so their heads will fall down through the exit ends of the upper throat or passage-ways into the receiver, the construction of which is best shown in Fig. 2, and by reference to which it will be seen a pair of horizontally-disposed rods 50 50$^a$ are projected from the vertical frames 6 6$^a$ and are supported at their inner ends on said frames, the vertical standards 30$^c$, that project up from the frame members 30, and the angle-braces 30$^b$. The receiver R is composed of sides $r$ $r'$, hinged at $r^2$ $r^2$ to the rods 50 and having at their lower ends drop-bottom members $r^3$ $r^3$, hinged to the lower ends of the sides $r$ $r'$ to swing up into the horizontal plane to form the bottom of the said receiver R'. The side members $r$ and the bottom sections $r^3$ are of such relative size that when the said members $r^3$ are swung up to form the bottom closure of the receiver the sides $r$ $r'$ will be held inclined inwardly, whereby to cause the cut stalks as they fall into the receiver to slide toward the center of the bottom thereof, it being observed by reference to the drawings that the upper end of the sides $r$ $r'$ of the receiver extend up as high as the wheels and are located at the outer edges of the stalk throatways or leads, so that the heads of the stalks as they are forced down engage the inclined side members $r^3$ $r^3$.

For conveniently and positively adjusting the drop-bottom members I provide a lever-actuated means consisting of a bell-crank lever 60, that may be worked by foot-pressure or by a hand member 60$^a$, arranged to engage a detent-lock 60$^b$ for holding the lever-actuated means in position to sustain the drop-bottom members at their closing or raised position, and to facilitate such operation and also to draw the two drop-sections toward each other and by reason of such movement set the sides $r$ $r'$ to their inclined position flexible hangers $h$ $h'$ are provided, which connect at their upper ends with the crank end 60$^c$ of the lever 60, and at their lower end they connect to the drop members $r^3$, and the said hangers also pass through an eye-guide 40$^h$, that projects from the rear edge of the platform 4.

By arranging the side and bottom members of the receiver R in the manner shown and described it will be apparent from the drawings that by releasing the lever 60 from its detent the weight of the bottom members $r^3$ $r^3$ and the shock gathered thereon will cause the said members $r^3$ $r^3$ to automatically drop and open to allow for the drop of the shock or bundle collected in the receiver through the opening in the receiver-bottom, and by turning the lever back to the normal position the members $r^3$ will be swung up, and by reason of the flexible hangers $h$ $h'$ engaging the eye 40$^h$ they will be drawn toward each other, and thereby cause the drop members as they are raised to pull inwardly and at the same time incline the sides $r$ $r'$ inwardly.

As before stated, the guide members 10 10$^a$, that form the inner sides of the upper portion of the stalk passages or throats, are laterally adjustable, whereby to close off the exit ends of said throat or passages during the operation of dropping the collected shock or bundle in the receiver, and to provide for effecting such closure adjustment of the members 10 10$^a$ as the shock or bundle is being dumped I connect the bow-spring rod 13 with the lever 60 in such manner that when the lever 60 is to its normal position the bottom members $r^3$ $r^3$ are closed, and the lower ends of the side members $r$ $r'$ are swung inward to incline the said sides. The guides 10 10$^a$ by reason of the contraction of the bow-spring rod 13 will be contracted to provide for the maximum width of the stalk-passages, but when the lever 60 is tripped and the bottom members $r^3$ $r^3$ are down to their open position to permit of the discharge of the gathered bundles or shock of stalks the said bow-spring rod 13 is expanded and the guides 10 10$^a$ are moved laterally over the stalk-passages to close off the exit ends of said passages, (see Fig. 2,) whereby to prevent the stalks from dropping down through the said exit ends of the throats or passages during the operation of discharging the collected bundles or shock.

From the foregoing, taken in connection with the drawings, the complete construction and arrangement of the parts constituting my invention will be apparent. In operation the horse travels between a pair of stalk-rows, the fingers or guides at each side straddling the stalks, which as they are severed by the cutters are turned down, with their heads falling onto the inclined sides of the receiver until a bundle or shock is collected. The driver by tripping the lever releases the lock that holds the bottom members $r^3$ $r^3$, which then drop, and in so doing they cause the lever to swing up, and thereby expand the bow-spring 13, which moves the guides 10 and 10$^a$ outward to check the feed or dropping of the next ones of the stalks being cut until the lever 60 is again set to raise the bottom members $r^3$ $r^3$, when the bow-spring contracts and draws the members 10 and 10$^a$ from over the stalk-passages to permit of the stalk-heads again falling over onto the sides of the receiver, the latter operation being positively effected by the action of the combined rotary and reciprocal movement of the sweep devices.

By reason of the peculiar construction of my harvester two rows of stalks can be cut, shocked, and dumped practically automatically and the entire action of the machine controlled by the driver through proper adjustments of the lever 60.

Having thus described my invention, what I claim, and desire to secure by Letters Patent, is—

1. In a corn-harvesting machine of the character described, the combination with the wheeled frame; the receiver R; the lower throats or stalk-passages and the cutter devices that operate over the lower throats or passages, said cutter devices being driven from the drive-wheels; of the upper throat or stalk-guides each including an outer downwardly and forwardly inclined side guide, and an inner inclined guide, the latter being mounted on the frame-platform and adjustable laterally to or from their opposing fixed guides and a means for moving the said adjustable side guides to or from the fixed guides in unison, whereby to increase or diminish the exit ends of the upper throats or stalk-passages as set forth.

2. The combination in a corn-harvesting machine, of the wheeled supporting-frame which includes a front or platform section and rearwardly-projecting sides, a supporting-wheel journaled in each of the rearwardly-projecting sides, a receiver mounted on the frame between the wheels, consisting of swinging sides, bottom members hinged to the lower ends of the sides, cutter mechanism for severing the stalks, means for turning the cut stalks down into the receiver, the crank-lever 60, the eye $h^4$ on the platform and the hangers that pass through the eye $h^4$ connected at the upper end to the lever and at their lower ends with the two bottom sections of the receiver, as set forth.

3. In a corn-harvesting machine, a wheel-supporting frame having a throat or guideway at each side; a cutter device operating over each of the said guideways or throats; a connection for each cutter device with its respective drive-wheel; a supporting means for the upper ends of the stalks, comprising a fixedly-held side guide, a sweep mounted in each of the fixedly-held side guides having fingers for engaging and turning the head ends of the stalks down through the exit ends of the stalk-passages, a receiver for said cut stalks the movable side guides and a means for adjusting the movable side guides for the stalk-passages operable from the driver's seat as set forth.

4. In a corn-harvesting machine of the character described; the combination with the wheeled frame, the receiver mounted between the wheels, a cutter device for each side and a means for guiding the stalks into engagement with the cutter devices; comprising the inclined guide members 9 and 9ª fixedly mounted on the frame, other side guides that coact with the guide members 9 and 9ª, said other guides being pivotally secured to the frame to swing toward and from their opposing guide members, a shaft journaled in each of the fixedly-held side guides geared with and driven by the cutter-actuating means, said shafts having each a crank member, a reciprocating finger or sweep-bar connected to said crank member having a guide portion slidable in a bearing in the fixedly-held member and a means for dumping the receiver as set forth.

5. The combination with the wheeled supporting-frame, comprising a front platform and rearwardly-extended side portions, in each of which a drive-wheel is journaled, a receiver suspended between the said rearwardly-extending side portions of the frame, said receiver consisting of swinging side members, and bottom sections hinged to the lower ends of the side members and adapted to drop by gravity and to be closed up to a horizontal position, the cutter devices one at each side of the platform, means for guiding the stalks to the said cutter devices; the driver-seat, the bell-crank lever pivotally mounted adjacent the driver's seat, a pair of pendent rods secured to the inner end of the lever, an eye-piece on the frame through which the pendent rods pass, said pendent rods being secured to the opposite bottom pieces of the receiver, guides for leading the upper or head end of the cut stalks into the receiver, said guides including the bars 10 pivotally secured to the platform, telescopically connected with each other and the bow-spring 13 connected with the said lever 60, all being arranged substantially as shown and for the purposes specified.

DAVID T. LOWE

Witnesses:
W. M. WARREN,
H. S. PHELPS